United States Patent

Brown et al.

[11] Patent Number: 6,120,897
[45] Date of Patent: Sep. 19, 2000

[54] TELEPHONE CABLES

[75] Inventors: Geoffrey David Brown, Bridgewater; Michael John Keogh, Somerville; Sari Beth Samuels, Ramsey; Jeffrey Morris Cogen, Flemington, all of N.J.

[73] Assignee: Union Carbide Chemicals & Plastics Technology Corporation, Danbury, Conn.

[21] Appl. No.: 08/048,371

[22] Filed: Apr. 15, 1993

[51] Int. Cl.$^7$ .................. B32B 1/06; H01B 3/18; H01B 11/00

[52] U.S. Cl. .............. 428/375; 428/379; 428/391; 428/447; 428/448; 428/450; 174/116; 174/120 R; 174/110 S

[58] Field of Search .................. 428/379, 375, 428/391, 446, 447, 448, 450, 451; 524/99, 104, 100; 548/406; 528/28; 174/101.5, 116, 113 R, 120 R, 110 S

[56] References Cited

U.S. PATENT DOCUMENTS

| | | |
|---|---|---|
| 3,660,438 | 5/1972 | Dexter . |
| 3,696,329 | 10/1972 | Hazelhurst ............... 174/101.5 |
| 3,745,231 | 7/1973 | Eager, Jr. et al. ........... 174/116 |
| 4,234,656 | 11/1980 | Amembal et al. ........... 428/379 |
| 4,430,235 | 2/1984 | Chu et al. ............... 252/49.6 |
| 4,684,726 | 8/1987 | Greco et al. ............... 544/69 |
| 4,879,378 | 11/1989 | Foster et al. ............. 556/439 |
| 4,888,375 | 12/1989 | Greco et al. ............. 524/262 |
| 4,895,885 | 1/1990 | Foster et al. ............... 524/99 |
| 4,927,898 | 5/1990 | King et al. ............... 528/27 |
| 4,946,880 | 8/1990 | Costanzi et al. ........... 524/96 |
| 4,948,888 | 8/1990 | Greco et al. ............... 544/69 |
| 4,952,619 | 8/1990 | Greco et al. ............... 524/96 |
| 4,960,810 | 10/1990 | Foster et al. ............. 524/265 |

FOREIGN PATENT DOCUMENTS

| | | |
|---|---|---|
| 343717 | 11/1989 | European Pat. Off. . |
| 388321 | 9/1990 | European Pat. Off. . |

*Primary Examiner*—Marie Yamnitzky
*Attorney, Agent, or Firm*—Saul R. Bresch

[57] ABSTRACT

An article of manufacture comprising (i) a plurality of electrical conductors, each surrounded by one or more layers of a composition comprising (a) one or more polyolefins and, bonded thereto or blended therewith, (b) a linear or cyclic organopolysiloxane containing one or more functionalized hindered amine moieties; and (ii) hydrocarbon cable filler grease within the interstices between said surrounded conductors.

2 Claims, No Drawings

TELEPHONE CABLES

TECHNICAL FIELD

This invention relates to wire and cable and the insulation and jacketing therefor and, more particularly, to telephone cable.

BACKGROUND INFORMATION

A typical telephone cable is constructed of twisted pairs of metal conductors for signal transmission. Each conductor is insulated with a polymeric material. The desired number of transmission pairs is assembled into a circular cable core, which is protected by a cable sheath incorporating metal foil and/or armor in combination with a polymeric jacketing material. The sheathing protects the transmission core against mechanical and, to some extent, environmental damage.

Of particular interest are the grease-filled telephone cables. These cables were developed in order to minimize the risk of water penetration, which can severely upset electrical signal transmission quality. A watertight cable is provided by filling the air spaces in the cable interstices with a hydrocarbon cable filler grease. While the cable filler grease extracts a portion of the antioxidants from the insulation, the watertight cable will not exhibit premature oxidative failure as long as the cable maintains its integrity.

In the cable transmission network, however, junctions of two or more watertight cables are required and this joining is often accomplished in an outdoor enclosure known as a pedestal (an interconnection box). Inside the pedestal, the cable sheathing is removed, the cable filler grease is wiped off, and the transmission wires are interconnected. The pedestal with its now exposed insulated wires is usually subjected to a severe environment, a combination of high temperature, air, and moisture. This environment together with the depletion by extraction of those antioxidants presently used in grease-filled cable can cause the insulation in the pedestal to exhibit premature oxidative failure. In its final stage, this failure is reflected in oxidatively embrittled insulation prone to cracking and flaking together with a loss of electrical transmission performance.

To counter the depletion of antioxidants, it has been proposed to add high levels of antioxidants to the polymeric insulation. However, this not only alters the performance characteristics of the insulation, but is economically unsound in view of the high cost of antioxidants. There is a need, then, for antioxidants which will resist cable filler grease extraction to the extent necessary to prevent premature oxidative failure and ensure the 30 to 40 year service life desired by industry.

DISCLOSURE OF THE INVENTION

An object of this invention, therefore, is to provide a grease-filled cable construction containing antioxidants, which will resist extraction and be maintained at a satisfactory stabilizing level. Other objects and advantages will become apparent hereinafter.

According to the invention, an article of manufacture has been discovered which meets the above object.

The article of manufacture comprises, as a first component, a plurality of electrical conductors, each surrounded by one or more layers of a composition comprising (a) one or more polyolefins and, bonded thereto or blended therewith, (b) a linear or cyclic organopolysiloxane containing one or more functionalized hindered amine moieties; and, as a second component, hydrocarbon cable filler grease within the interstices between said surrounded conductors.

In one other embodiment, the article of manufacture comprises first and second components; however, the mixture of the first component contains absorbed hydrocarbon cable filler grease or one or more of the hydrocarbon constituents thereof and, in another embodiment, the article of manufacture is comprised only of the first component wherein the mixture contains hydrocarbon cable filler grease or one or more of the hydrocarbon constituents thereof.

DESCRIPTION OF THE PREFERRED EMBODIMENTS

The polyolefins used in this invention are generally thermoplastic resins, which are crosslinkable. They can be homopolymers or copolymers produced from two or more comonomers, or a blend of two or more of these polymers, conventionally used in film, sheet, and tubing, and as jacketing and/or insulating materials in wire and cable applications. The monomers useful in the production of these homopolymers and copolymers can have 2 to 20 carbon atoms, and preferably have 2 to 12 carbon atoms. Examples of these monomers are alpha-olefins such as ethylene, propylene, 1-butene, 1-hexene, 4-methyl-1-pentene, and 1-octene; unsaturated esters such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates; diolefins such as 1,4-pentadiene, 1,3-hexadiene, 1,5-hexadiene, 1,4-octadiene, and ethylidene norbornene, commonly the third monomer in a terpolymer; other monomers such as styrene, p-methyl styrene, alpha-methyl styrene, p-chloro styrene, vinyl naphthalene, and similar aryl olefins; nitriles such as acrylonitrile, methacrylonitrile, and alpha-chloroacrylonitrile; vinyl methyl ketone, vinyl methyl ether, vinylidene chloride, maleic anhydride, vinyl chloride, vinylidene chloride, vinyl alcohol, tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. The homopolymers and copolymers of ethylene and propylene are preferred, both in the non-halogenated and halogenated form. Included in this preferred group are terpolymers such as ethylene/propylene/diene monomer rubbers.

Other examples of ethylene polymers are as follows: a high pressure homopolymer of ethylene; a copolymer of ethylene and one or more alpha-olefins having 3 to 12 carbon atoms; a homopolymer or copolymer of ethylene having a hydrolyzable silane grafted to their backbones; a copolymer of ethylene and a hydrolyzable silane; or a copolymer of an alpha-olefin having 2 to 12 carbon atoms and an unsaturated ester having 4 to 20 carbon atoms, e.g., an ethylene/ethyl acrylate or vinyl acetate copolymer; an ethylene/ethyl acrylate or vinyl acetate/hydrolyzable silane terpolymer; and ethylene/ethyl acrylate or vinyl acetate copolymers having a hydrolyzable silane grafted to their backbones.

With respect to polypropylene: homopolymers and copolymers of propylene and one or more other alpha-olefins wherein the portion of the copolymer based on propylene is at least about 60 percent by weight based on the weight of the copolymer can be used to provide the polyolefin of the invention. The polypropylene can be prepared by conventional processes such as the process described in U.S. Pat. No. 4,414,132. The alpha-olefins in the copolymer are preferably those having 2 or 4 to 12 carbon atoms.

The homopolymer or copolymers can be crosslinked or cured with an organic peroxide, or to make them hydrolyzable, they can be grafted with an alkenyl trialkoxy silane in the presence of an organic peroxide which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers can be moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates.

The homopolymers or copolymers of ethylene wherein ethylene is the primary comonomer and the homopolymers and copolymers of propylene wherein propylene is the primary comonomer may be referred to herein as polyethylene and polypropylene, respectively.

For each 100 parts by weight of polyolefin, the other components of the insulation mixture can be present in about the following proportions:

|  | Parts by Weight | |
| --- | --- | --- |
| Component | Broad Range | Preferred Range |
| (i) organopoly-<br>siloxane<br>containing<br>hindered amine | 0.01 to 5 | 0.1 to 1 |
| (ii) grease | 3 to 30 | 5 to 25 |

The organopolysiloxane, mentioned above, can contain 2 to about 200 siloxane units and preferably contains about 3 to about 100 siloxane units. At least one of the siloxane units must contain at least one functionalized hindered amine moiety; however, all of the siloxane units can contain one or more functionalized hindered amine moieties. Aside from the siloxane units containing the functionalized hindered amine moiety, generally, any of the known siloxane units can make up the organopolysiloxane.

A typical siloxane unit, which does not contain the functionalized hindered amine moiety has the following structural formula:

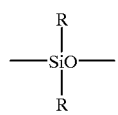

wherein R is an alkyl, aryl, alkaryl, alkoxy, alkenyl or aralkyl, each having 1 to 20 carbon atoms, and each R can be the same or different.

The siloxane unit containing the functionalized hindered amine moiety can be represented by the following structural formula:

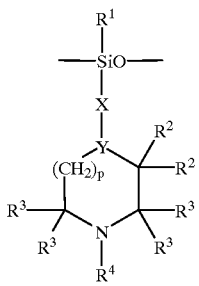

wherein $R^1$=alkyl, alkoxy, or mixtures thereof;

X=oxygen; a linear or branched chain alkylene; alkylene oxy; alkylene amine $(CH_2)_a CONH$; or $(CH_2)_a COO$ wherein a is at least one;

Y=C or N;

p=0, 1, or 2;

$R^2$=hydrogen or alkyl and each $R^2$ can be the same or different, or the $R^2$s together can be one oxygen atom;

$R^3$=hydrogen or alkyl and each $R^3$ can be the same or different; and $R^4$=hydrogen, alkyl, alkoxy, hydroxy, or oxyl.

In one preferred embodiment of the above:

With respect to $R^1$, the alkyl and alkoxy can be 1 to 20 carbon atoms; the alkylene in the X moiety can have 1 to 6 carbon atoms; the alkyl in the $R^2$ moiety can have 1 to 3 carbon atoms; the alkyl in the $R^3$ moiety can have 1 to 4 carbon atoms; and the alkyl and alkoxy in the $R^4$ moiety can have 1 to 20 carbon atoms.

In a more preferred embodiment:

$R^1$==alkyl, alkoxy, or mixtures thereof wherein the alkyl and alkoxy have 1 to 20 carbon atoms;

X=oxygen or alkylene oxy having 1 to 6 carbon atoms;

Y=C;

p=0, 1, or 2;

$R^2$=hydrogen;

$R^3$=methyl; and $R^4$=hydrogen or alkyl having 1 to 6 carbon atoms.

In the most preferred embodiment, everything is the same as in the preceding more preferred embodiment except that $R^1$=methyl; p=1; and $R^4$=hydrogen.

The organopolysiloxane can contain one or two of the following terminal units: $R_3SiO$—; $R_3Si$—; $R^5O_{0.5}$—; or a functionalized hindered amine moiety such as that depicted in the above structural formula. R is as defined above; each R can be the same or different;

and $R^5$ can be hydrogen, an alkyl having 1 to 20 carbon atoms, or a substituted or unsubstituted phenyl group.

The organopolysiloxane may also contain small amounts of the following siloxane units (known as T and Q units in the silicone nomenclature): $R^1SiO_{3/2}$; functionalized hindered amine* —$SiO_{3/2}$ (*such as that depicted in the above structural formula); and/or $SiO_{4/2}$.

Examples of suitable functionalized hindered amines follow:

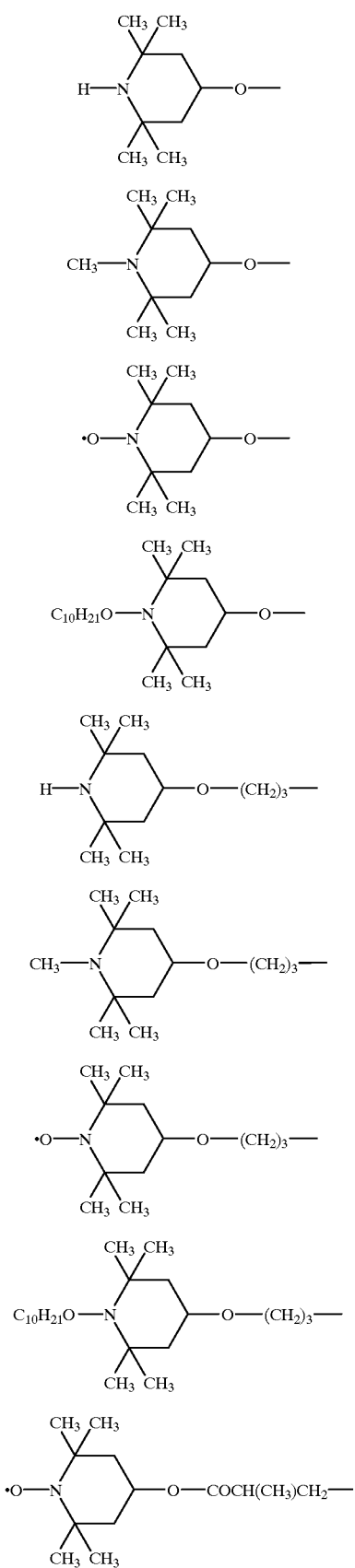
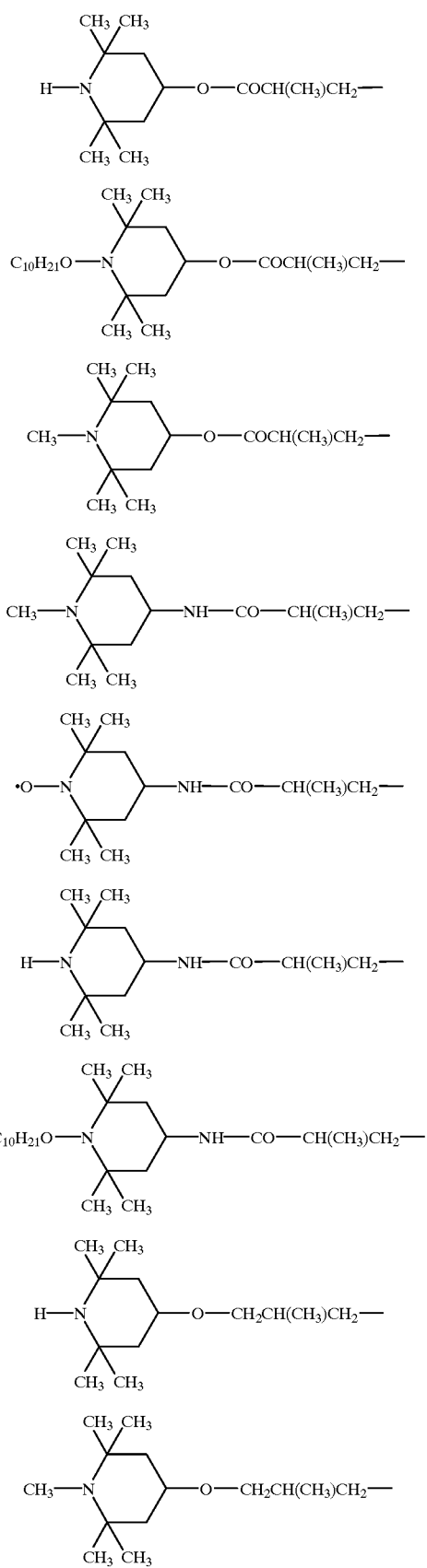

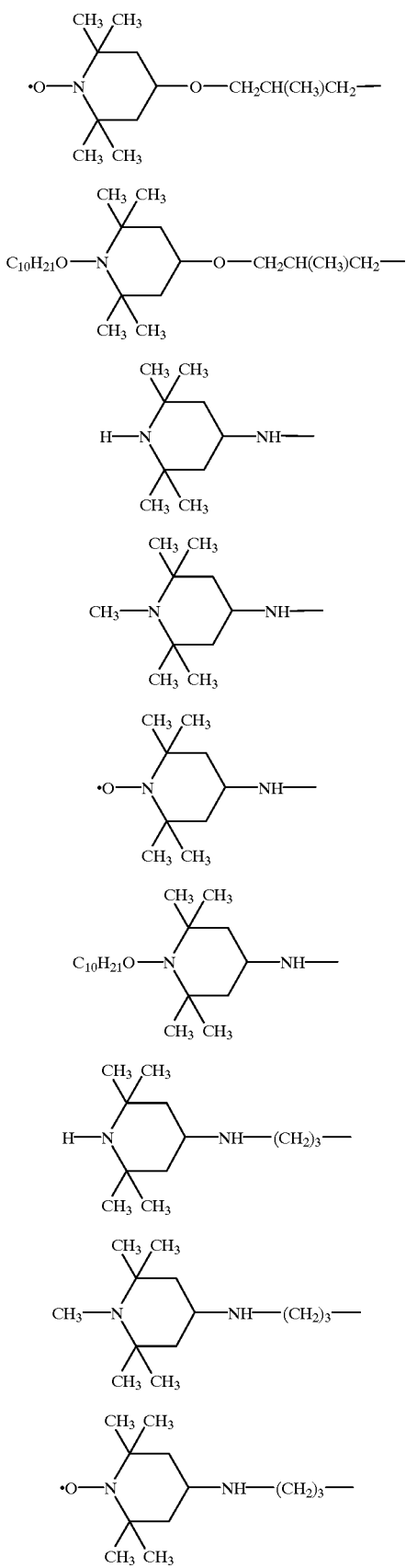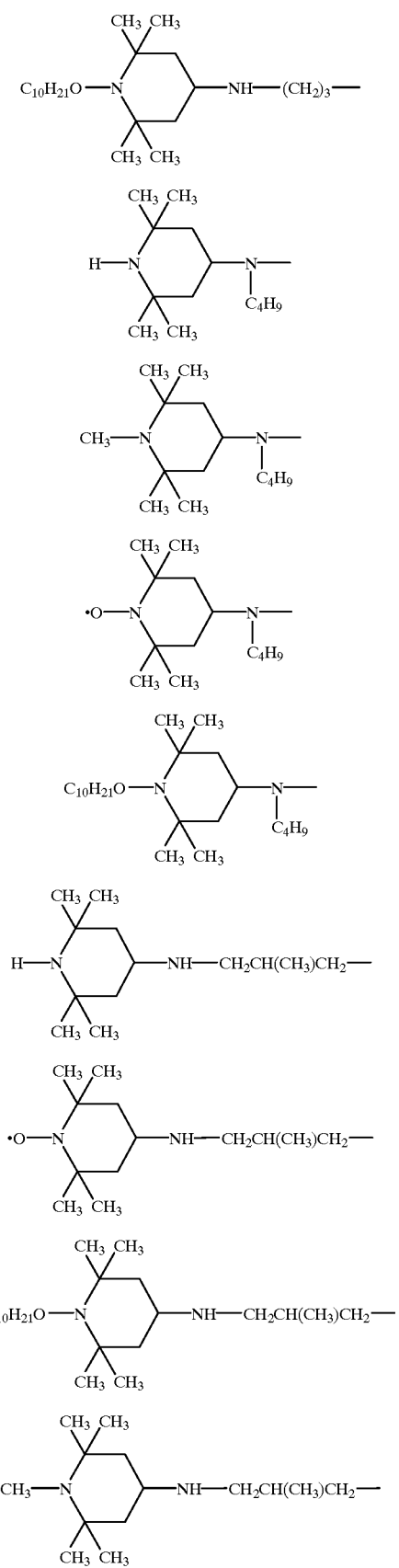

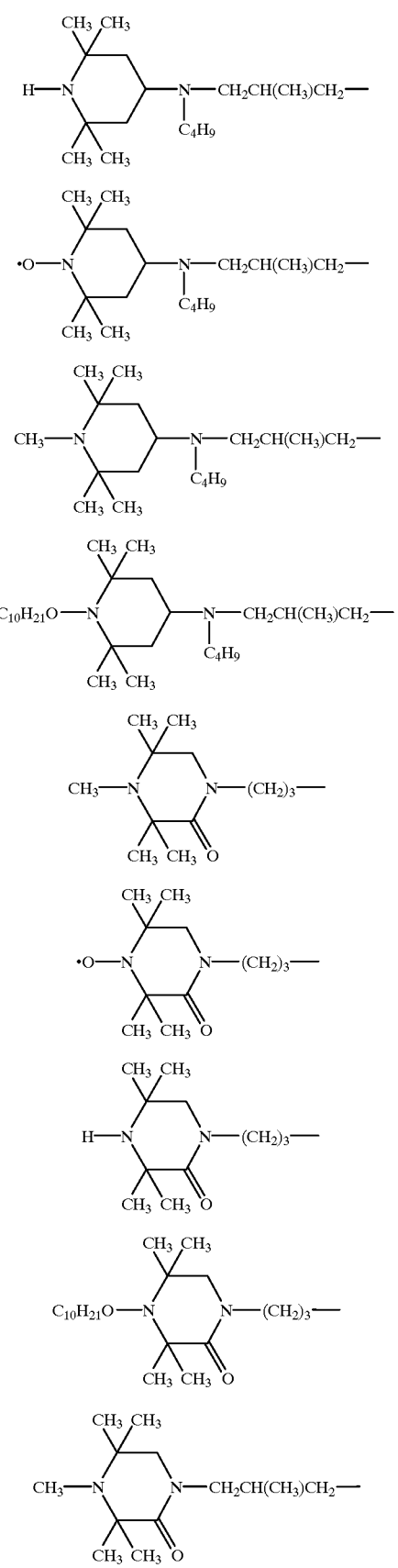
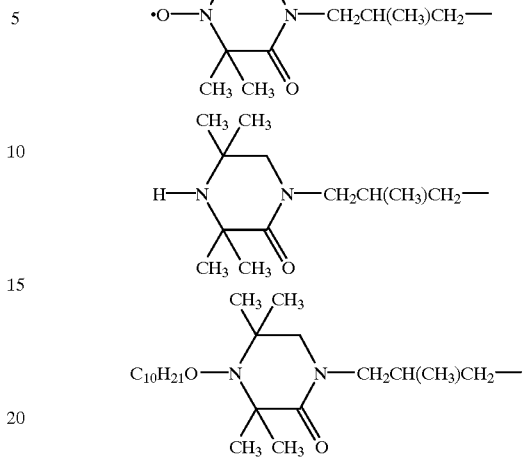

Hydrocarbon cable filler grease is a mixture of hydrocarbon compounds, which is semisolid at use temperatures. It is known industrially as "cable filling compound". A typical requirement of cable filling compounds is that the grease has minimal leakage from the cut end of a cable at a 60° C. or higher temperature rating. Another typical requirement is that the grease resist water leakage through a short length of cut cable when water pressure is applied at one end. Among other typical requirements are cost competitiveness; minimal detrimental effect on signal transmission; minimal detrimental effect on the physical characteristics of the polymeric insulation and cable sheathing materials; thermal and oxidative stability; and cable fabrication processability.

Cable fabrication can be accomplished by heating the cable filling compound to a temperature of approximately 100° C. This liquefies the filling compound so that it can be pumped into the multiconductor cable core to fully impregnate the interstices and eliminate all air space. Alternatively, thixotropic cable filling compounds using shear induced flow can be processed at reduced temperatures in the same manner. A cross section of a typical finished grease-filled cable transmission core is made up of about 52 percent insulated wire and about 48 percent interstices in terms of the areas of the total cross section. Since the interstices are completely filled with cable filling compound, a filled cable core typically contains about 48 percent by volume of cable filling compound.

The cable filling compound or one or more of its hydrocarbon constituents enter the insulation through absorption from the interstices. Generally, the insulation absorbs about 3 to about 30 parts by weight of cable filling compound or one or more of its hydrocarbon constituents, in toto, based on 100 parts by weight of polyolefin. A typical absorption is in the range of a total of about 5 to about 25 parts by weight per 100 parts by weight of polyolefin.

It will be appreciated by those skilled in the art that the combination of resin, cable filling compound constituents, and antioxidants in the insulation is more difficult to stabilize than, an insulating layer containing only resin and antioxidant, and no cable filling compound constituent.

Examples of hydrocarbon cable filler grease (cable filling compound) are petrolatum; petrolatum/polyolefin wax mixtures; oil modified thermoplastic rubber (ETPR or extended thermoplastic rubber); paraffin oil; naphthenic oil; mineral oil; the aforementioned oils thickened with a residual oil, petrolatum, or wax; polyethylene wax; mineral oil/rubber block copolymer mixture; lubricating grease; and various mixtures thereof, all of which meet industrial requirements similar to those typified above.

Generally, cable filling compounds extract insulation antioxidants and, as noted above, are absorbed into the polymeric insulation. Since each cable filling compound contains several hydrocarbons, both the absorption and the extraction behavior are preferential toward the lower molecular weight hydrocarbon wax and oil constituents. It is found that the insulation composition with its antioxidant not only has to resist extraction, but has to provide sufficient stabilization (i) to mediate against the copper conductor, which is a potential catalyst for insulation oxidative degradation; (ii) to counter the effect of residuals of chemical blowing agents present in cellular and cellular/solid (foam/skin) polymeric foamed insulation; and (iii) to counter the effect of absorbed constituents from the cable filling compound.

The polyolefin can be one polyolefin or a blend of polyolefins. The organopolysiloxane containing the functionalized hindered amine can either be bonded to the polyolefin and/or blended with the polyolefin. The composition containing the foregoing can be used in combination with disulfides, phosphites or other non-amine antioxidants in molar ratios of about 1:1 to about 1:6 for additional oxidative and thermal stability, but, of course, it must be determined to what extent these latter compounds are extracted by the grease since this could affect the efficacy of the combination.

The following conventional additives can be added in conventional amounts if desired: ultraviolet absorbers, antistatic agents, pigments, dyes, fillers, slip agents, fire retardants, stabilizers, crosslinking agents, halogen scavengers, smoke inhibitors, crosslinking boosters, processing aids, e.g., metal carboxylates, lubricants, plasticizers, viscosity control agents, and blowing agents such as azodicarbonamide. The fillers can include, among others, magnesium hydroxide and aluminum trihydrate. As noted, other antioxidants and/or metal deactivators can also be used, but for these or any of the other additives, resistance to grease extraction must be considered. 1,2-bis(3,5-di-tert-butyl-4-hydroxy-hydrocinnamoyl)hydrazine added as an adjunct metal deactivator and antioxidant is desirable.

Additional information concerning grease-filled cable can be found in Eoll, *The Aging of Filled Cable with Cellular Insulation,* International Wire & Cable Symposium Proceeding 1978, pages 156 to 170, and Mitchell et al, *Development, Characterization, and Performance of an Improved Cable Filling Compound,* International Wire & Cable Symposium Proceeding 1980, pages 15 to 25. The latter publication shows a typical cable construction on page 16 and gives additional examples of cable filling compounds.

Additional examples of various polyolefins, organopolysiloxanes, and hindered amines useful in the invention can be found in U.S. Pat. Nos. 4,167,512; 4,190,571; 4,292,240; 4,297,497; 4,684,726; 4,895,885; 4,927,898; 4,935,063; 4,946,880; 4,948,888; and 4,952,619; and in European Patent applications 89201239.4 and 90420051.6.

The patents, patent applications, and other publications mentioned in this specification are incorporated by reference herein.

The invention is illustrated by the following examples.

EXAMPLES

Examples 1 to 4 are carried out under an atmosphere of dry nitrogen using conventional techniques.

Example 1

A three neck flask equipped with a Dean-Stark™ trap, a thermometer, an overhead mechanical stirrer, and a drop-wise addition funnel is charged with 484 grams of xylene and 430.2 grams of 2,2,6,6-tetramethyl-4-hydroxypiperidine and the mixture is dried by removal of a small amount of azeotrope. With the pot temperature at 100° C., three grams of a silicone fluid having the average structure:

wherein
x=5
y=15
are added followed by the addition of a slurry containing one gram of xylene and 201 milligrams of diiodo(2,5-cyclooctadiene)platinum(II). Over a one hour period, an additional 272 grams of the aforementioned silicone fluid are added drop-wise (caution: hydrogen evolution). The mixture is then allowed to stir for an additional 10 hours at 135° C. by which time infrared spectroscopy indicates an absence of the Si—H absorbance. Activated carbon is added, the mixture is allowed to cool to room temperature, and the mixture is pressure filtered through a small plug of diatomaceous earth. Solvent and the unreacted piperidine compound are removed under vacuum affording 684.5 grams of antioxidant A.

Example 2

Example 1 is repeated using 571 grams of xylene; 577.6 grams of the piperidine compound; 236 milligrams of the platinum compound; and a total of 250 grams of a silicone fluid (see above) wherein x=0 and y=20. The product is 812 grams of antioxidant B.

Example 3

The allyl ether of the piperidine compound referred to in Example 1 is prepared by reacting its potassium salt with allyl chloride in dimethoxyethane.

This ether (85.89 grams) and 109 grams of toluene are charged to a three neck flask fitted with a condenser, dropping funnel, mechanical stirrer, and thermometer. With the temperature held at 85° C., three grams of a silicone fluid (see above) wherein x=0 and y=30 are added followed by the addition of 0.54 milliliter of isopropanol containing 13 milligrams of chloroplatinic acid. An additional 20.1 grams of the silicone fluid are added drop-wise. After stirring at 85° C. for an hour, an additional 0.26 milliliter of the chloroplatinic acid solution is added. The mixture is allowed to react until infrared analysis indicates disappearance of the Si—H absorbance. Activated carbon is added, the mixture is allowed to cool to room temperature, and the mixture is pressure filtered through a small plug of diatomaceous earth. Solvent is removed under vacuum. The product is 98.6 grams of antioxidant C.

Example 4

Using conventional procedures, a silicone resin is prepared by partial hydrolysis of methyl triethoxy-silane with a quantity of water sufficient to afford a product containing 43.85 percent by weight ethoxy groups after removal of volatiles under vacuum. In a three neck flask equipped with a thermometer, a magnetic stirrer, and a distillation head, 513 grams of the silicone resin is combined with 571 grams of toluene, 629 grams of the piperidine compound referred to in Example 1, and 1.14 grams of sodium ethoxide in 4.3 grams of ethanol.

The mixture is then refluxed until a total of 4.1 moles of ethanol is removed as an azeotrope with toluene. After allowing the mixture to cool to room temperature, the mixture is treated with 1.26 grams of acetic acid. The volatiles are stripped by heating the crude mixture at 150° C. and 45 Torr. After treatment of the resulting fluid with 0.5 gram of activated carbon and 0.5 gram of diatomaceous earth at 150° C., filtration afforded 854 grams of antioxidant D.

Examples 5 to 10

Various materials used in the examples are as follows:

Polyethylene I is a copolymer of ethylene and 1-hexene. The density is 0.946 gram per cubic centimeter and the melt index is 0.80 to 0.95 gram per 10 minutes.

Antioxidants A to D are prepared in Examples 1 to 4, respectively.

Antioxidant E is an organopolysiloxane containing functionalized hindered amine moieties. It is prepared by the hydrolysis of the hydrosilylation product of methyldiethoxysilane with the allyl ether of 2,2,6,6-tetramethyl-4-hydroxypiperidine, as described in U.S. Pat. No. 4,946,880. Antioxidant E has a number average molecular weight of 1800.

Antioxidant F is 1,2-bis(3,5-di-tert-butyl-4-hydroxy-hydrocinnamoyl)hydrazine.

For examples 5 to 10, 10 mil polyethylene plaques are prepared for oxidation induction time (OIT) testing. The plaques are prepared from a mixture of polyethylene I and the antioxidants mentioned above.

A laboratory procedure simulating the grease filled cable application is used to demonstrate performance. Resin samples incorporating specified antioxidants are prepared. The samples are first pelletized and then formed into approximately 10 mil (0.010 inch) thick test plaques using ASTM D-1928 methods as a guideline. There is a final melt mixing on a two roll mill or laboratory Brabender™ type mixer followed by preparation of the test plaques using a compressor molding press at 150° C. Initial oxygen induction time is measured on these test plaques.

A supply of hydrocarbon cable filler grease is heated to about 80° C. and well mixed to insure uniformity. A supply of 30 millimeter dram vials are then each filled to approximately 25 millimeters with the cable filler grease. These vials are then cooled to room temperature for subsequent use. An oil extended thermoplastic rubber (ETPR) type cable filler grease is the hydrocarbon cable filler grease used in these examples. It is a typical cable filling compound.

Each ten mil test plaque is then cut to provide about twenty approximately one-half inch square test specimens. Before testing, each vial is reheated to about 70° C. to allow for the easy insertion of the test specimens. The specimens are inserted into the vial one at a time together with careful wetting of all surfaces with the cable filler grease. After all of the specimens have been inserted, the vials are loosely capped and placed in a 70° C. circulating air oven. Specimens are removed after 2 and 4 weeks, the surfaces are wiped dry with tissue, and the specimens are tested for OIT. After 4 weeks, the remaining specimens are removed, wiped dry, and placed in a static air chamber at 90° C. At various intervals, specimens are removed and tested for OIT.

OIT testing is accomplished in a differential scanning calorimeter with an OIT test cell. The test conditions are: uncrimped aluminum pan; no screen; heat up to 200° C. under nitrogen, followed by a switch to a 50 milliliters per minute flow of oxygen. Oxidation induction time (OIT) is the time interval between the start of oxygen flow and the exothermic decomposition of the test specimen. OIT is reported in minutes; the greater the number of minutes, the better the OIT. OIT is used as a measure of the oxidative stability of a sample as it proceeds through the cable filler grease exposure and the oxidative aging program. Relative performance in the grease filled cable applications can be predicted by comparing initial sample OIT to OIT values after 70° C. cable filler grease exposure and 90° C. oxidative aging.

Variables and results are set forth in the following Table.

TABLE

| Example | 5 | 6 | 7 | 8 | 9 | 10 |
|---|---|---|---|---|---|---|
| Formulation (% by wt): | | | | | | |
| Polyethylene | 99.40 | 99.40 | 99.40 | 99.40 | 99.40 | 99.60 |
| Antioxidant A | 0.20 | — | — | — | — | — |
| Antioxidant B | — | 0.20 | — | — | — | — |
| Antioxidant C | — | — | 0.20 | — | — | — |
| Antioxidant D | — | — | — | 0.20 | — | — |
| Antioxidant E | — | — | — | — | 0.20 | — |
| Antioxidant F | 0.40 | 0.40 | 0.40 | 0.40 | 0.40 | 0.40 |
| OIT (minutes): | | | | | | |
| Initial | 214 | 198 | 173 | 218 | 196 | 140 |
| 2 Weeks | 193 | 174 | 157 | 171 | 183 | 98 |
| 4 Weeks | 180 | 173 | 172 | 179 | 179 | 87 |
| 8 Weeks | 154 | 150 | 146 | 126 | 152 | 66 |
| 12 Weeks | 140 | 136 | 119 | 115 | — | 68 |
| 16 Weeks | 118 | 119 | — | — | — | 65 |

What is claimed is:

1. An article of manufacture comprising (i) a plurality of electrical conductors, each surrounded by one or more layers of a composition comprising a mixture of (a) one or more polyolefins and bonded thereto or blended therewith a linear or cyclic organopolysiloxane containing one or more functionalized hindered amine moieties and (b) 1,2-bis(3,5-di-tert-butyl-4-hydroxy-hydrocinnamoyl)hydrazine; and (ii) hydrocarbon cable filler grease within the interstices between said surrounded conductors.

2. An article of manufacture comprising (i) a plurality of electrical conductors, each surrounded by one or more layers of a composition of a mixture of (a) polyethylene, polypropylene, or mixtures thereof and, bonded thereto or blended therewith, an organopolysiloxane having about 3 to about 100 siloxane units, one or more of said units having the following structural formula:

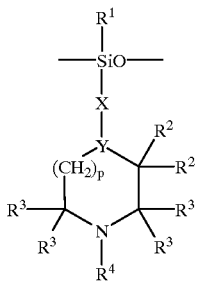

wherein
$R^1$=methyl;
X=oxygen or alkylene oxy having 1 to 6 carbon atoms;

Y=C;
p=1;
$R^2$=hydrogen;
$R^3$=methyl; and
$R^4$=hydrogen;
and (b) 1,2-bis(3,5-di-tert-butyl-4-hydroxy-hydrocinnamoyl)hydrazine; and (ii) hydrocarbon cable filler grease within the interstices between said surrounded conductors, wherein the organopolysiloxane is present in an amount of about 0.01 to about 5 parts by weight based on 100 parts by weight of polyolefin.

* * * * *